Aug. 25, 1942.  J. J. BOLTON, JR., ET AL  2,294,156
INDICATOR
Filed Dec. 2, 1941  2 Sheets-Sheet 1

Inventors
*James J. Bolton, Jr.*
*and Thomas Sykes*
By *Stevens & Davis*
Attorneys Aug. 25, 1942.  J. J. BOLTON, JR., ET AL  2,294,156
INDICATOR
Filed Dec. 2, 1941    2 Sheets-Sheet 2

Inventors
James J. Bolton, Jr.
and Thomas Sykes
By Stevens and Davis
Attorneys

Patented Aug. 25, 1942

2,294,156

UNITED STATES PATENT OFFICE 2,294,156

INDICATOR

James J. Bolton, Jr., Merion, and Thomas Sykes, Philadelphia, Pa., assignors to C. H. Wheeler Manufacturing Company, Philadelphia, Pa., a corporation of Pennsylvania Application December 2, 1941, Serial No. 421,386

8 Claims. (Cl. 116—124)

This invention relates to indicators and is more particularly concerned with devices for rendering a visual indication of the extent of angular displacement of a rotatable shaft from a predetermined point.

In many types of apparatus control of necessary adjustments is effected through the manual rotation of a shaft connected to a handwheel or the like. Since, in effecting such adjustments, the operator may be required to overcome considerable resistance, gear reductions are frequently necessary to afford mechanical advantage with the result that an angular displacement of the control shaft considerably in excess of 360° may be required in order to bring about a desired change in position of the controlled element. As a consequence of such relatively great amplitudes of angular displacement on the part of control shafts, indicators associated therewith cannot be directly connected, since after 360° of movement, any type of scale calibration will begin to repeat with resulting confusion on the part of the operator.

Of course, solutions to the foregoing problem have long been known and it is now customary to provide gear reduction systems to the end that the indicator may move to an extent proportional to the extent of angular displacement of the control shaft but may have a reduced amplitude of movement. Such arrangements are satisfactory within certain limits where, for instance, the total movement of the control shaft is relatively small, i. e., a very few turns, or where the space occupied by the gear reduction system is of little moment.

Gear reduction systems as at present known are not, however, satisfactory when employed with shafts which must have relatively great amplitudes of angular displacement and which must be positioned in locations where space is at a premium. While it will be recognized that a number of such situations arise in the industrial world, a particular problem has been encountered in conjunction with the various remote control systems used in naval vessels. In such instances, accuracy of indication and reliability must be, without impairment, correlated with compactness.

The problem encountered in fitting out naval vessels has been recently still further complicated by the employment of airplane hoist equipment allowing catapult launched planes to be raised to a ship deck from a seaway. Since such equipment is normally operated through hydraulic transmissions, the stroking of which must be most accurately controlled from a station on the bridge, it is evident that an accurate indicator must be associated with the control handwheel for the guidance of the operator and that, in this situation, conventional gear reduction systems of suitable accuracy are wholly unsatisfactory because of their space requirements.

It is therefore an object of this invention to solve the foregoing problems and to provide a sturdy and compact indicator system in association with a rotatable shaft which will render accurate indications of extent of angular displacement of such shaft.

According to this invention it is contemplated that the indicator be movable in the direction of the shaft with which it is associated at a rate and to an extent proportional to its angular displacement and that it be readily adaptable to a wide variety of requirements as regards to total amplitude of rotative movement of a control shaft.

Other objects and advantages of the invention will be apparent from a consideration of the following detailed description of a preferred embodiment thereof in conjunction with the annexed drawings wherein.

Referring more specifically to the drawings, the device consists of a handwheel 10 keyed at 11 to a shaft 12 which in turn extends directly, or through universal joints, to the adjustment spindle of a hydraulic transmission, not shown. By rotation of shaft 12 the delivery speed of the hydraulic transmission may be varied from a neutral position to a full speed position in either direction. To adjust from neutral to full speed usually requires some 2 revolutions of shaft 12, varying more or less according to the type of apparatus operated.

Since in the hoisting of seaborne aircraft it is essential that the control be as accurate as possible and that the operator be fully apprised of the position of the transmission adjustment spindle at all times, an indicator arm 13 is associated with shaft 12 to indicate angular displacement thereof on a plaque 14 having a calibrated scale. This scale may, of course, be calibrated directly in degrees of angular displacement of shaft 12 or may bear suitable designations as to what conditions are brought about at any predetermined angular position thereof. Thus, the angular displacement of shaft 12 is indicated by the relative positions of indicator arm 13 and stationary plaque 14. Clearly this arrangement could be reversed, and by driving the plaque and maintaining the indicator arm stationary the same results can be attained.

Figure 3:
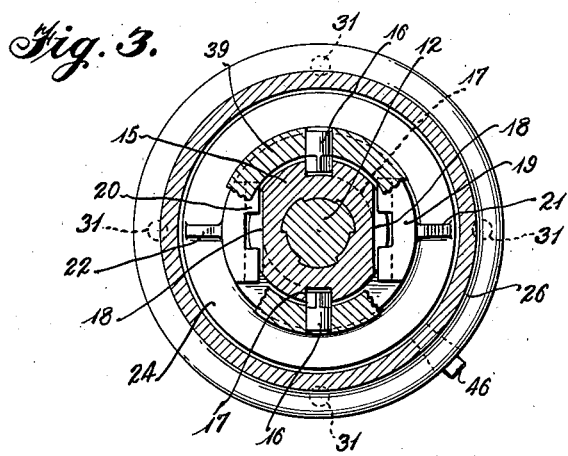
Figure 3 is a view in section taken along the line 3—3 of Figure 2.
Figures 2, 4:
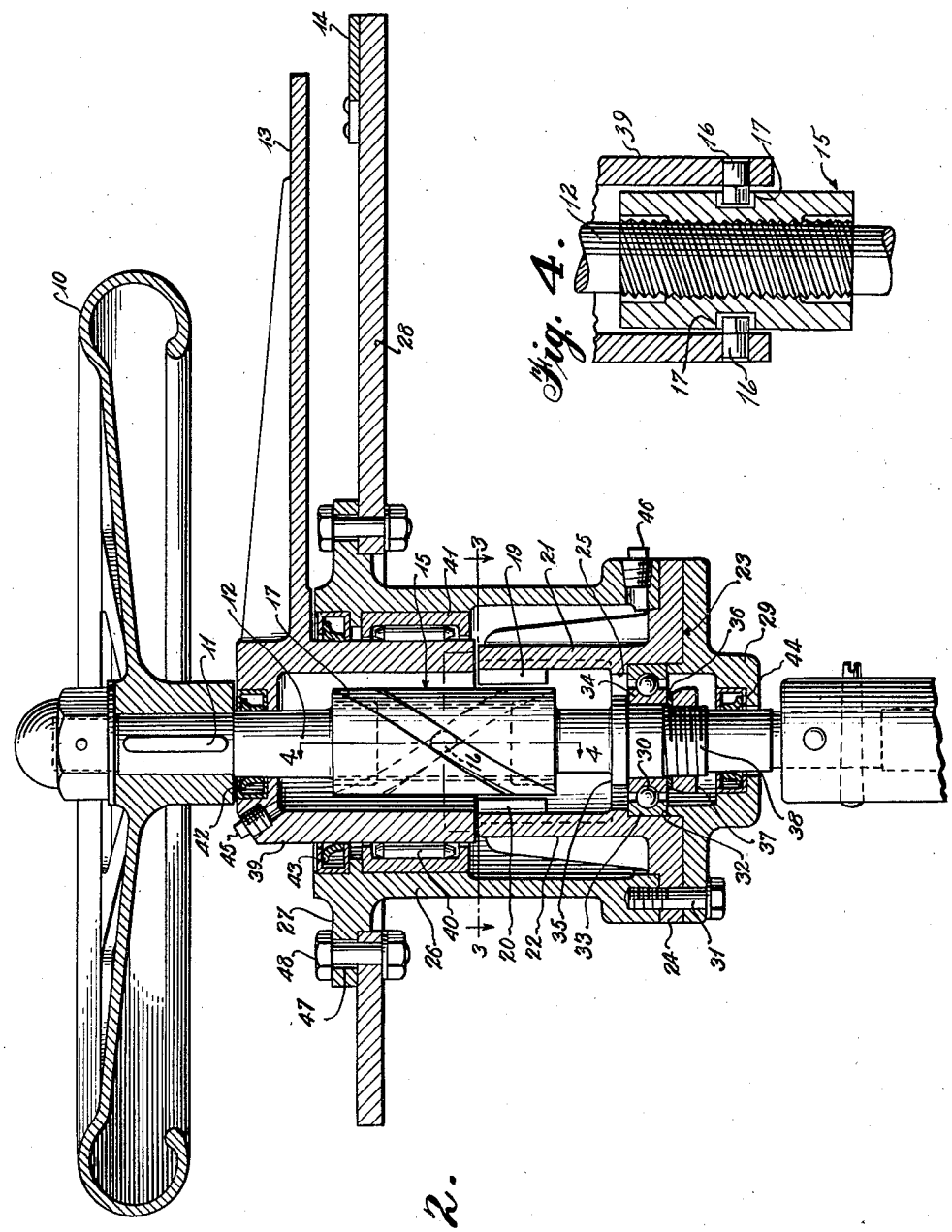
Figure 2 is a view in vertical section taken along the line 2—2 of Figure 1.
Figure 4 is a vertical sectional view taken along the line 4—4 of Figure 2.

To bring about movement of indicator arm 13 to an extent proportional to that of shaft 12, the connections shown in Figures 2, 3 and 4, are employed. These comprise chiefly a sleeve 15 driven axially by shaft 12 to an extent proportional to the angular displacement of the latter and followers 16 disposed in helical grooves 17 of said sleeve for transmitting its axial movement in the form of angular displacement of indicator arm 13. So that sleeve 15 may be driven axially of shaft 12 it is interiorly triple threaded, as indicated in Figure 3, for cooperation with a triple threaded zone extending axially of shaft 12. The mere threaded engagement of sleeve 15 and shaft 12, would not, of course, result in proportional relative axial movement, it being necessary to hold sleeve 15 against rotation in order that it may move axially in response to rotation of shaft 12. In this connection it should be noted that sleeve 15 is not exteriorly cylindrical, but is provided with two parallel flattened zones 18 extending chordwise thereof for the entire axial length. These zones cooperate with inwardly extending arms 19 and 20 integral respectively with vertically extending members 21 and 22 which are integral with and extend upwardly from an annular member 23 having an outwardly extending annular flange 24 and an inwardly extending annular flange 25.

Figure 1:
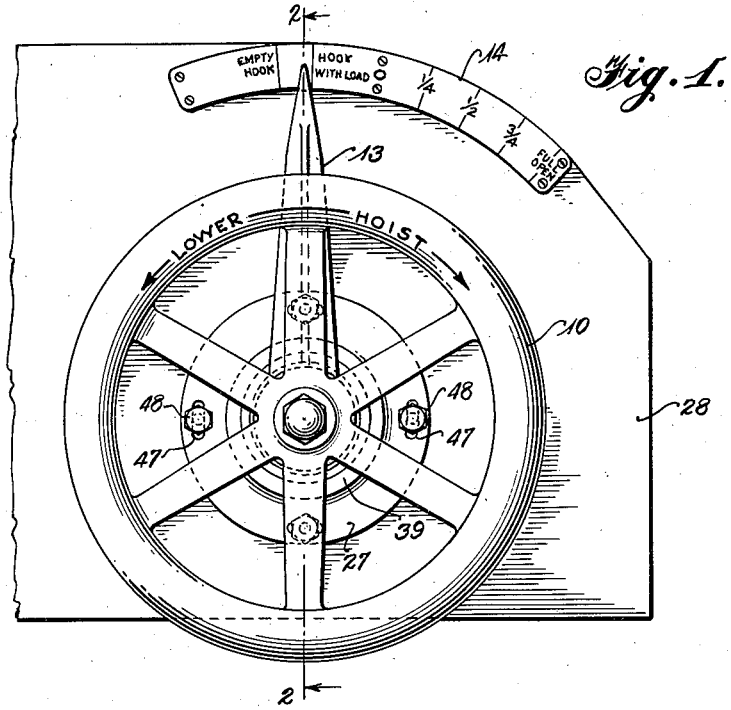
Figure 1 is a top plan view of a control handwheel and associated indicator system applied to the remote control station for the operation of the A end of a hydraulic transmission.

Annular member 23, and hence its integral parts 19, 20, 21 and 22, is held against rotation by connection of its flange 24 to a concentric sleeve 26 provided with an annular flange 27 overlying and connected to stationary plate 28, which, as shown in Figure 1, is the cover plate for the instrument housing at the control station. It is this plate 28 which also carries, fixedly attached thereto, calibrated plaque 14, the latter being disposed in an arc corresponding to the path of movement of indicator arm 13.

In addition to the stationary parts just mentioned a cap 29 is provided for the purpose of assisting in the support of ball bearings 30 for shaft 12. This cap is connected by four bolts 31 which are driven into threaded sockets in the bottom of sleeve 26, flange 24 being also provided with registering bolt holes so that it may be held between the marginal portion of cap 29 and the bottom edge of sleeve 26. Cap 29 is provided with an annular shoulder 32 the upper edge of which cooperates with flange 25 of annular member 23 to hold outer portion 33 of a race for ball bearings 30. Inner portion 34 of said race is held from shaft 12, the latter being provided with an annular flange 35 contacting the upper surface of portion 34, while a washer 36 is drawn against the lower surface thereof. Washer 36 is held in position by a nut 37 in threaded engagement with a portion 38 of shaft 12. Balls 30 thus constitute both a radial and an axial thrust bearing for shaft 12.

Having now described the stationary portions of the apparatus and the manner in which they serve to prevent rotation of sleeve 15 and support bearings for shaft 12, the movable portion of the device will be discussed. This consists of a sleeve 39 mounted concentrically over shaft 12 and sleeve 15 but extending within sleeve 26. Indicator arm 13 is integral with and extends radially from sleeve 39 for rotative movement in a plane parallel to but above the plane of plaque 14. Movement is imparted to this sleeve through axial movement of sleeve 15 which will cause angular displacement of pins 16 which, as can be seen in Figure 3, extend radially inwardly from socket in sleeve 39 into helical grooves 17. Antifriction roller bearings 40 disposed in a race 41 facilitate this movement.

The remaining structural details of the apparatus comprise oil seals 42, 43 and 44 and plugs 45 and 46, through which a suitable lubricant may be supplied. Additionally it should be noted that flange 27 of sleeve 26 is provided with elongated slots 47 for the reception of bolts 48 which serve to fasten the flange to the edge of plate 28 which defines the opening for shaft 12 and the associated parts. Because of the provision of slots 47, the stationary portions of the equipment supported from sleeve 26 may be initially placed in the exact angular position desired after which bolts 48 may be tightened to maintain the adjustment.

The operation of the apparatus just described is now evident. Upon rotation of shaft 12 through handwheel 10 to effect an adjustment of the element under the control of said shaft, sleeve 15 will be moved either axially upwardly or downwardly depending upon the direction of rotation of shaft 12. Since the connection involves helical screw threads, it is apparent that the axial movement of sleeve 15 per degree of angular displacement of shaft 12 will be constant, having an amplitude dependent upon that of the helix angle or pitch of the threads. Thus, by variation in the pitch of the threads connecting sleeve 15 and shaft 12, increase or decrease in the axial displacement of sleeve 15 per degree of angular displacement of shaft 12 is possible.

The foregoing, however, is not the only speed reduction factor afforded by the present invention, for sleeve 15 is provided with oppositely directed helical grooves 17, 180° apart, from which projections 16, and hence sleeve 39 and indicator arm 13, are driven. It is therefore clear that a variation in the helix angle of grooves 17 will have the effect of increasing or decreasing the angular displacement of indicator arm 13 per unit of axial movement of sleeve 25. Thus, with a helix angle of 9.7 degrees in the threaded connection between sleeve 15 and shaft 12 and a helix angle of 61.305 degrees for grooves 17, it is possible to effect an 20.572 to one ratio between shaft 12 and indicator arm 13.

Although the form of the invention just described is concerned with an application thereof to the control of an A end of a hydraulic transmission, it is apparent that the invention is of wide applicability in indicating the rate and extent of angular displacement of any shaft.

We claim:

1. A device for indicating the extent of angular displacement of a shaft comprising, means movable by said shaft axially thereof to an extent proportional to that of its angular displacement, and relatively rotatable indicating elements, one of said indicating elements being displaced with respect to the other of said elements by said means to an extent proportional to the axial displacement thereof, the axis of rotation of the element which is displaced being also the axis of the shaft.

2. A device for indicating the extent of angular displacement of a shaft comprising, means movable by said shaft axially thereof to an extent proportional to that of its angular displacement, relatively movable indicating elements, and means coaxial of said shaft responsive to movement of said axially movable means for effecting angular displacement of one of said indicating elements with respect to the other of said elements to an extent proportional to such axial movement.

3. A device for indicating the extent of angular displacement of a shaft comprising, means movable by said shaft axially thereof to an extent proportional to that of its angular displacement, an indicator arm, a cooperating scale, and means coaxial of said shaft for effecting angular displacement of said arm relative to said scale to an extent proportional to the extent of axial displacement of said axially movable means.

4. A device for indicating the extent of angular displacement of a shaft comprising, means surrounding said shaft and adapted to be moved thereby axially thereof to an extent proportional to that of its angular displacement, means surrounding said first named means adapted to be angularly displaced to an extent proportional to the extent of axial displacement of said first named means, an indicator carried by said second named means, and stationary means in registry with said indicator to afford a basis for determination of the amplitude of relative displacement of said indicator and said stationary means.

5. In a construction including a rotatable handwheel and a coacting indicator arm and scale for indicating the amplitude of movement of said handwheel, a threaded shaft driven by said handwheel, a sleeve threaded on said shaft, said sleeve having a surface groove therein disposed at an angle to its long axis, a follower disposed in said groove and connected to said indicator arm, and means for holding said sleeve against rotative movement, whereby said follower will be subject to angular displacement which is imparted to said indicator arm upon rotation of said handwheel.

6. In a construction including a rotatable handwheel and a coacting indicator arm and scale for indicating the amplitude of movement of said handwheel, a threaded shaft driven by said handwheel, a sleeve threaded on said shaft, a helical groove in the external surface of said sleeve, a follower disposed in said groove and connected to said indicator arm, and means for holding said sleeve against rotative movement, whereby said follower will be subject to angular displacement to an extent proportional to the extent of axial movement of said sleeve which in turn is proportional to the extent of angular displacement of the handwheel.

7. In a construction including a rotatable handwheel and a coacting indicator arm and scale for indicating the extent of angular displacement of said handwheel, a shaft extending axially of the handwheel and rotatable therewith, a sleeve mounted over said shaft for axial movement with respect thereto, said sleeve being interiorly threaded and said shaft being provided with cooperating threads for a portion of its length in excess of the length of the threaded area of said sleeve, said sleeve also being provided with a helical groove, a second sleeve surrounding said grooved sleeve having the indicator arm extending radially therefrom, a follower extending inwardly from said second sleeve into the groove of the grooved sleeve, and stationary means including bearings for said shaft and said second sleeve and means for holding said grooved sleeve against rotative movement, whereby angular displacement of said shaft will result in proportional movement of lesser amplitude on the part of the indicator arm.

8. In a construction including a rotatable handwheel and a coacting indicator arm and scale for indicating the extent of angular displacement of said handwheel, a shaft extending axially of the handwheel and rotatable therewith, a sleeve mounted over said shaft for axial movement with respect thereto, said sleeve being internally threaded and said shaft being provided with cooperating threads for a portion of its length in excess of the length of the threaded area of said sleeve, said sleeve having diametrically opposed flattened areas and being provided with two oppositely directed helical grooves disposed 180° apart, a second sleeve surrounding said grooved sleeve and having the indicator arm extending radially therefrom, followers extending inwardly from said second sleeve into the respective grooves of the grooved sleeve, whereby the axial movement of said grooved sleeve causes an angular movement of said second sleeve, and stationary means including bearings for said shaft and said second sleeve and means acting on the flattened portions of said grooved sleeve to hold the same against rotative movement, whereby angular displacement of said shaft will result in angular movement of lesser amplitude on the part of the indicator arm with respect to said scale.

JAMES J. BOLTON, Jr.
THOMAS SYKES.